(12) United States Patent
Azagury et al.

(10) Patent No.: US 6,430,580 B1
(45) Date of Patent: Aug. 6, 2002

(54) METHOD OF REPLICATION-BASED GARBAGE COLLECTION IN A MULTIPROCESSOR SYSTEM

(75) Inventors: Alain Azagury, Nesher; Elliot Karl Kolodner; Erez Petrank, both of Haifa, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,721

(22) Filed: Jun. 25, 1999

(30) Foreign Application Priority Data

Jun. 30, 1998 (EP) .............................................. 98480045

(51) Int. Cl.⁷ .............................................. G06F 17/00
(52) U.S. Cl. ......................... 707/206; 707/200; 711/200
(58) Field of Search ........................ 702/1–206; 714/47, 714/48; 711/154, 147–160, 200–209; 707/1–206; 709/102–108

(56) References Cited

U.S. PATENT DOCUMENTS 5,355,483 A * 10/1994 Serlet .......................... 711/154
5,897,634 A * 4/1999 Attaluri et al. .............. 707/103
6,151,688 A * 11/2000 Wipfel et al. ................. 714/48

OTHER PUBLICATIONS

"Concurrent Compacting Garbarge Collection of a Presistent Heap" by J. O'Toole, et al, "Operating Systems Review" (SiGOPS), 27 No. 5 (Dec. 1993) pp. 161–174.

"Lock–Free Garbage Collection for Multiprocessors", by M.P. Herlihy, et al, "IEEE Transactions on Parallel and Distributed Systems", vol. 3, No. 3 (May 1992), pp. 306–311.

"Concurrent Replicating Garbage Collection" by J. O'Toole, et al, "LISP 94", (Jun. 1994) pp. 34–42.

* cited by examiner

*Primary Examiner*—David Jung
(74) *Attorney, Agent, or Firm*—Douglas W. Cameron; Anne Vachon Dougherty

(57) ABSTRACT

Improved method of replication-based garbage collection in a multiprocessing system comprising a plurality of processors, a memory divided into a current area (from-space) used by the processors during current program execution and a reserved area (to-space), and at least a garbage collector for performing, when necessary, a garbage collection consisting in flipping the roles of the current area and reserved area after all the live objects stored in current area have been copied into the reserved area and for reclaiming the current area after the flipping operation. Several program threads (mutators) are currently running in parallel and the garbage collector performs the garbage collection in parallel with the program threads, the flipping operation being performed after the program threads have been stopped and the garbage collection has been completed. The method comprises the steps of storing, during normal program execution, a record in a local buffer allocated to each program thread each time this one updates a memory location, and adding this local buffer when full to a global list of buffers using a first wait-free synchronization operation, and, during garbage collection, removing the local buffers one by one from the global list of buffers using a second wait-free synchronization operation, and looping over records in each removed local buffer and copying the updated memory locations into the reserved area until the global list is empty.

16 Claims, 4 Drawing Sheets

METHOD OF REPLICATION-BASED GARBAGE COLLECTION IN A MULTIPROCESSOR SYSTEM

FIELD OF THE INVENTION

The present invention relates generally to a technique for automatically reclaiming the memory space which is occupied by data objects, referred to as garbage, that the running program will not access any longer and relates particularly to a method of replication-based garbage collection in a multiprocessor environment.

BACKGROUND OF THE INVENTION

Garbage collection is the automatic reclamation of computer storage. While in many systems programmers must explicitly reclaim heap memory at some point in the program, by using a <<free>> or <<dispose>> statement, garbage collected systems free the programmer from this burden. The garbage collector's function is to find data objects that are no longer in use and make their space available for reuse by the running program. An object is considered garbage, and subject to reclamation, if it is not reachable by the running program via any path of pointer traversals. Live (potentially reachable) objects are preserved by the collector, ensuring that the program can never traverse a <<dangling pointer>> into a deallocated object.

The basic functioning of a garbage collector consists, abstractly speaking, of two parts:

1. Distinguishing the live objects from the garbage in some way, or garbage detection, and
2. Reclaiming the garbage objects' storage, so that the running program can use it.

In practice, these two phases may be functionally or temporally interleaved, and the reclamation technique is strongly dependent on the garbage detection technique.

In general, the garbage colectors use a <<liveness>> criterion that is somewhat more onservative than those used by other systems. This criterion is defined in terms of a root set and reachability from these roots. At the point when garbage collection occurs, all globally visible variables of active procedures are considered live, and so are the local variables of any active procedures. The root set therefore consists of the global variables; local variables in the activation stack, and any registers used by active procedures. Heap objects directly reachable from any of these variables could be accessed by the running program, so they must be preserved. In addition, since the program might traverse pointers from those objects to reach other objects, any object reachable from a live object is also live. Thus, the set of live objects is simply the set of objects on any directed path of pointers from the roots. Any object that is not reachable from the root set is garbage, i.e., useless, because there is no legal sequence of program actions that would allow the program to reach that object. Garbage objects therefore cannot affect the future course of the computation, and their space may be safely reclaimed.

Given the basic two-part operation of a garbage collector, several variations are possible. The first part, that of distinguishing live objects from garbage, may be done by several methods. Among them, the method of copying garbage collection does not really collect garbage. Rather, it moves all of the live objects into one area of the heap (space in the memory where all objects are held) whereas the area of reclaimed objects can be reused for new objects.

A very common kind of copying garbage collection is the semi-space collector. In this scheme, the space devoted to the heap is subdivided into two parts, a current area or from-space and a reserved area or to-space. During normal program execution, only the from-space is in use. When the running program requests an allocation that will not fit in the unused area of the from-space, the program is stopped and the copying garbage collector is called to reclaim space. The roles of the current area and reserved area are flipped, that is all the live data are copied from the from-space to the to-space. Once the copying is completed, the to-space is made the current area and program execution is resumed. Thus, the roles of the two spaces are reversed each time the garbage collector is invoked.

The technique of replication-based garbage collection is to let the collector work in parallel with the program threads or mutators. In contrast to previous copying garbage collection algorithms, replication-based garbage collection delays the flip until the end of the collection cycle. While the mutators keep running and operate on from-space, the collector replicates the live objects from the from-space to the to-space. Finally, in the flip stage, the mutators are stopped and then roots are updated to point to the replicated objects in the to-space.

But, while the replication is executed, objects in from-space keep on changing and this has to be reflected in the to-space replica. In order to make the replica consistent, the mutators log all modifications to a mutation log. The collector flips after it has cleared the mutation log (i.e., has applied each update on the replica). Really, the collector stops the mutator threads for a short pause during which the collector updates the mutator roots, and then flips the roles of from-space and to-space.

However, the above replication-based garbage collection is not suitable for a modern multiprocessor system wherein it is not guaranteed that the operations executed by one processor always appear in the same order in the view of another processor. Thus, it is possible that the collector will see the update of a location only after it reads the update to the mutation log. From the collector standpoint, this means that it might copy the contents of the location before the new value actually appears in its view. As a consequence, the new replica in to-space will contain an outdated value of the location which, furthermore, will never be updated.

SUMMARY OF THE INVENTION

Accordingly, the main object of the invention is to provide a new method of replication-based garbage collection which can be run in a multiprocessor system without the risk that the contents of memory locations will be replicated from the current area to the reserved area without their updates being taken into consideration.

Therefore, the invention relates to an improved method of replication-based garbage collection in a multiprocessing system comprising a plurality of processors, a memory divided into a current area (from-space) used by the processors during current program execution and a reserved area (to-space), and at least one garbage collector for performing, when necessary, a garbage collection consisting of flipping the roles of the current area and reserved area after all the live objects stored in the current area have been copied into the reserved area and for reclaiming the current area after the flipping operation. Several program threads (mutators) are currently running in parallel and the garbage collector performs the garbage collection in parallel with the program threads, the flipping operation being performed after the program threads have been stopped and the garbage collection has been completed. The method of replication-based garbage collection comprises the steps of storing, during normal program execution, a record in a local buffer allocated to each program thread each time this program thread updates a memory location, and adding this local buffer, when full, to a global list of buffers using a first synchronization operation, and, during garbage collection, removing the local buffers one by one from the global list of buffers using a second synchronization operation, looping over records in each removed local buffer, and copying the updated memory locations into the reserved area until the global list is empty.

BRIEF DESCRIPTION OF THE DRAWINGS

The objects, characteristics and advantages of the invention will become clear from the following description given in reference to the accompanying drawings wherein.

DETAILED DESCRIPTION OF THE INVENTION

Figure 1:
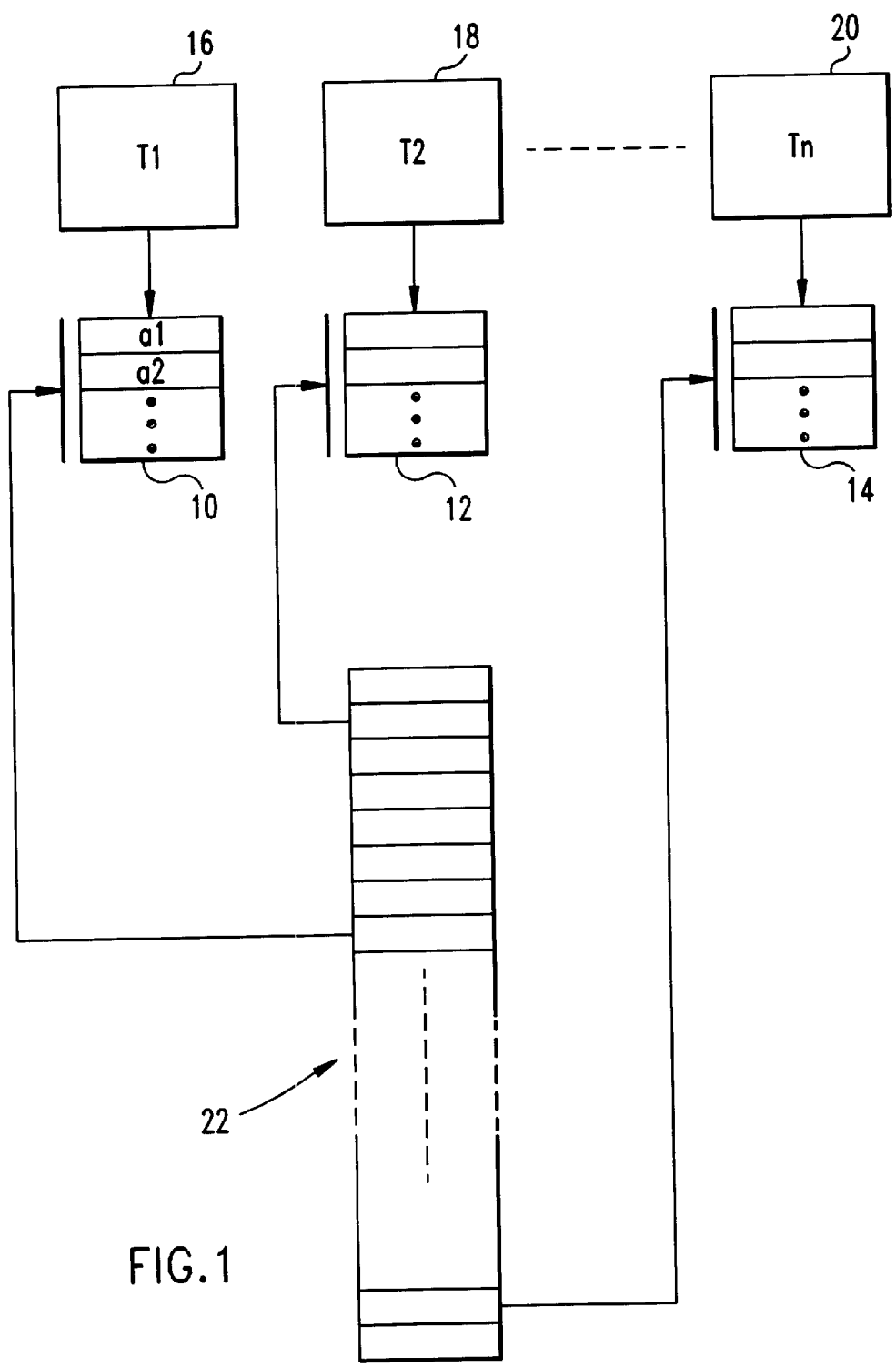
FIG. 1 represents a schematic block-diagram of the local buffers associated with each processor in a multiprocessor system and the global list of the local buffers according to the method of the invention.

Referring to FIG. 1, the principle of the invention is to associate a local buffer 10, 12 or 14 respectively to each one of the program threads 16, 18 or 20 running in parallel. This local buffer is used by the program thread to store all its mutation records rather than storing them directly into the mutation log, as in the previous methods for replication based garbage collection. Once a local buffer 10, 12 or 14 is filled with records, the mutator adds a pointer to a global list 22 which is an array of pointers. Adding a pointer to global list 22 is done using a synchronization operation as explained below. When the garbage collection is performed, the collector removes the pointers from the global list one by one using the same synchronization mechanism, and performs the needed updates on the replica as dictated by the buffer records.

Note that processes could be used instead of program threads to implement the invention. Such a process contains an address space and several threads, one of them being the main thread. Each thread (sometimes called thread of control) has its own stack, registers, and program counter. All threads share the memory space of the process. When a process with no threads is run, all the properties of a thread become the properties of the process.

Figure 2:
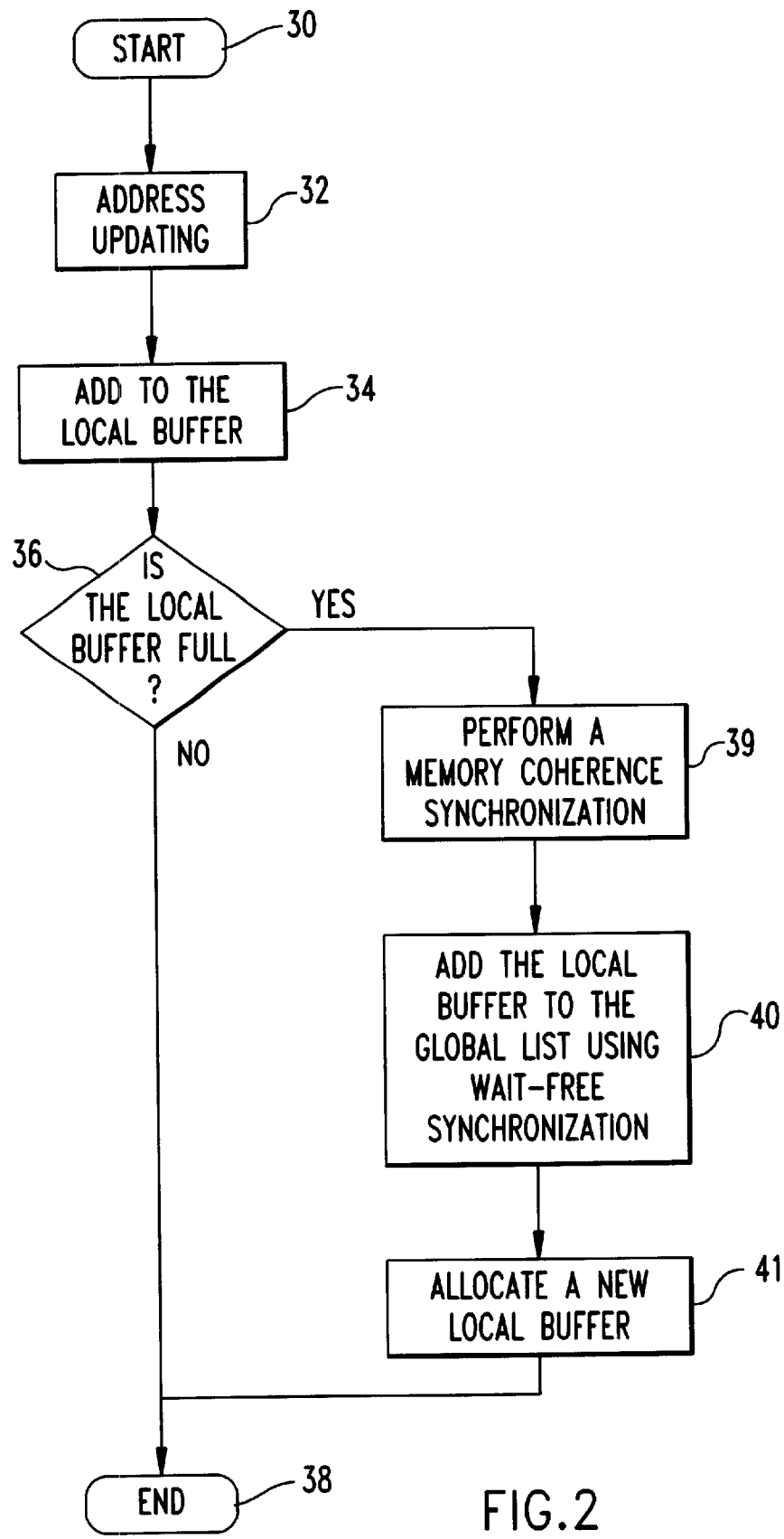
FIG. 2 is a flow chart representing the steps of updating memory locations and storing records in a local buffer by a mutator.
Figure 3:
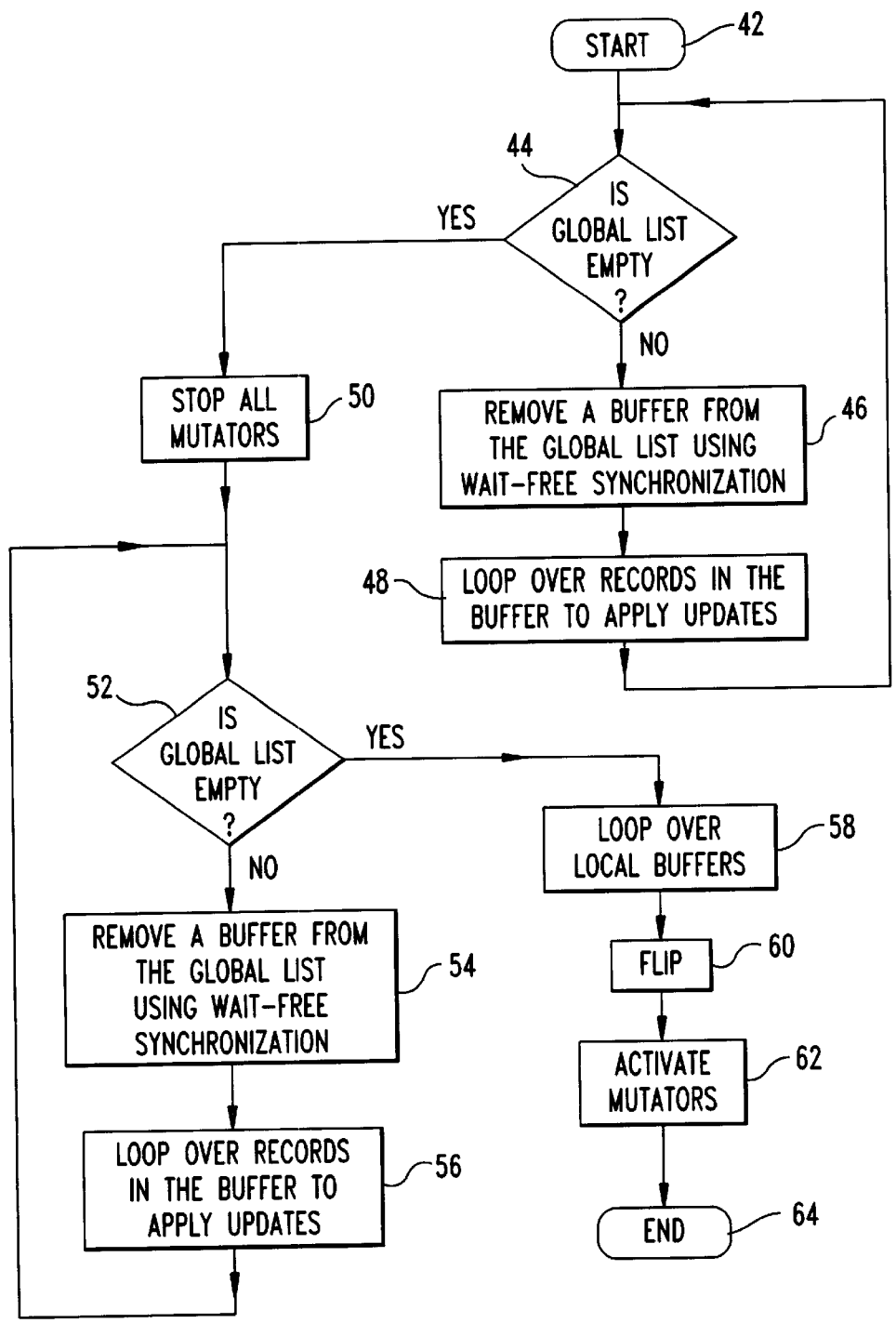
FIG. 3 is a flow chart representing the different steps under the control of the collector during a collection cycle according to the method of the invention.
Figure 4:
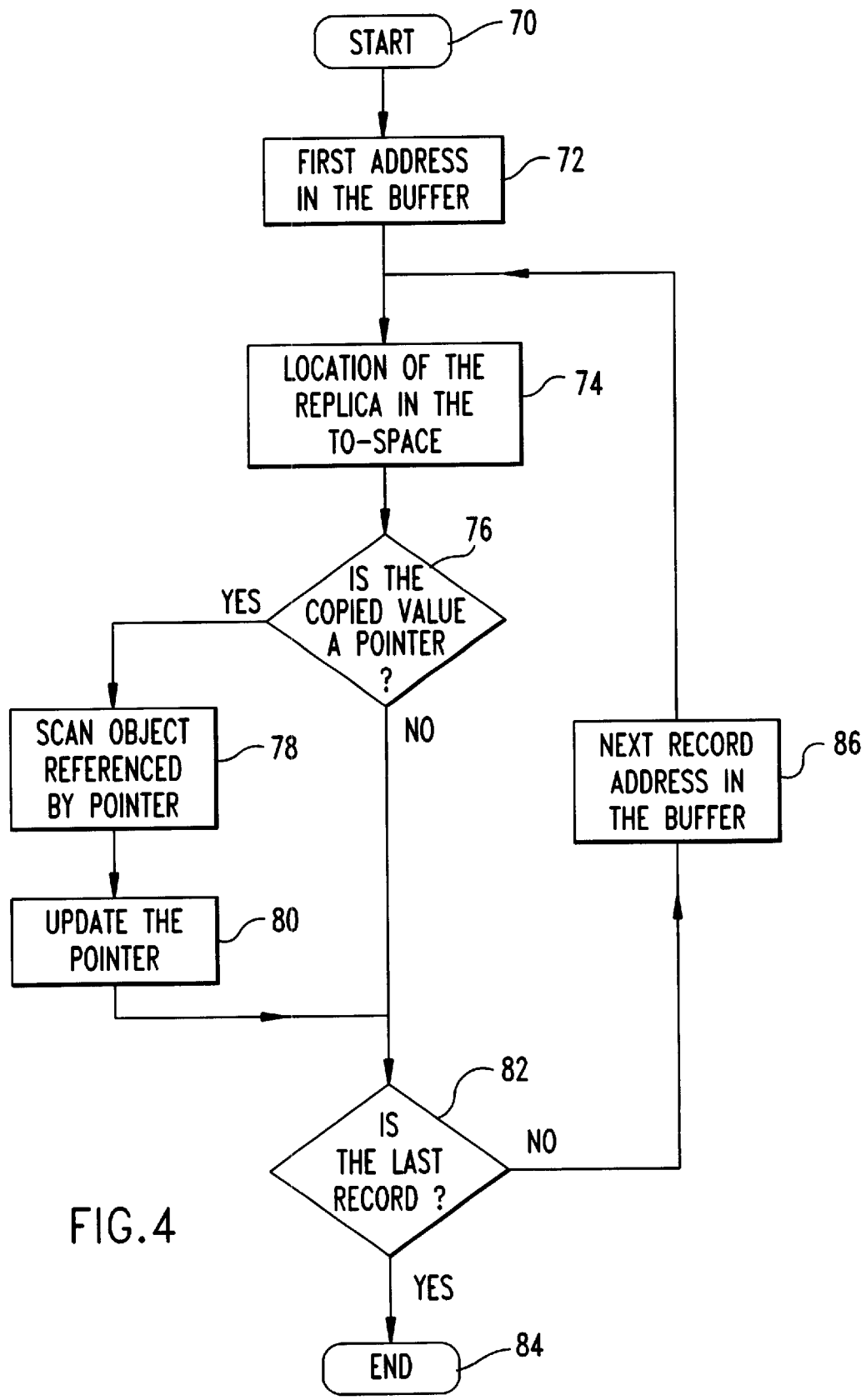
FIG. 4 is a flow chart representing the different steps performed by the collector for looping over records in a local buffer during a collection cycle according to the method of the invention.

The different steps of the method according to the invention are detailed in FIGS. 2, 3 and 4. As illustrated in FIG. 2, after starting (30) the collection cycle, the program thread, also called mutator, updates a memory location (changes its contents) (32). The record of this update is stored in the associated local buffer (34). It is then determined whether the local buffer is full (36). If not, the updating operation is ended (38). If so, a memory coherence synchronization is first performed (39). Then, the local buffer is added to the global list of buffers using synchronization, such as a wait-free synchronization or any other appropriate synchronization as it is well known to those skilled in the art, since the global list is shared by all mutators and the collector (40). After the synchronization, a new local buffer is allocated to the mutator (41).

Note that the memory coherence synchronization is required in view of the <<partial memory coherence>>, meaning that when a program thread on one processor performs several write operations, the order of the updates may be different for a second program thread running on a different processor. When this incoherence endangers the correctness of a concurrent program, the programmer must make sure that such an inconsistency does not occur at the sensitive spots in the program. Each platform offers its special instruction to settle the memory coherence. These instructions mean that any update operation that is performed before the memory coherence synchronization instruction is perceived by all threads as occurring before any update performed after the memory coherence synchronization.

Note also that, although any appropriate synchronization could be used for adding a local buffer to global list, a wait-free synchronization is preferable. Indeed, a wait-free synchronization operation is performed by a synchronization mechanism that works in a <<wait-free>> manner, that is without blocking the computer that uses the instruction. Such an operation can be a compare and swap instruction including three parameters: address, compared-value, and new-value. If the memory value for a given address matches the given compared-value, then the new-value is put into the location. The instruction returns a code indicating whether the comparison and setting were successful. The main feature of this instruction is that it is done atomically. Namely, no parallel process can change the value at the same time that the compare and swap instruction is executed. After the failure of such an instruction, the process may decide whether to try again or to execute another code after the failure. Conversely to a wait-free synchronization, a blocking synchronization is a synchronization which keeps the processor blocked until a certain event happens. Thus, with a blocking synchronization, a processor performing a work fed by another processor may decide to wait until a record is written into the shared list of records when this list is empty. In the invention, the wait-free synchronization guarantees that, if more than one mutator is modifying the global list by adding a local buffer, then the global list will not be corrupted and the changes will be reflected properly in the list. It must be noted that, on some platforms, a wait-free synchronization causes an implicit memory coherence synchronization. In such a case, only the wait-free synchronization of step 40 in FIG. 2 is needed and step 39 does not exist.

In parallel with the recording of location updating by the mutators, the collector starts (42) the buffer reading cycle as illustrated in FIG. 3. It is first determined whether the global list is empty (44). If not, a buffer is removed from the global list (46) using a wait-free synchronization operation identical to the synchronization operation used for adding the buffers to the global list. Then, the collector goes over all records in the buffer and copies the changed values into the memory to-space (48).

In case the global list of local buffers is empty, the collector stops all mutators (50) for finishing the collection. It verifies again whether the global is empty (52) since one of the mutators may have added a buffer before stopping. If not, the collector performs again the operation of removing the buffers from the global list (54) and the operation of looping over records in the buffers to apply updates (56). When the global list has been emptied while the mutators have been stopped, the collector loops over all local buffers that have not yet been added to the global list (58). At last, the collector completes the collection cycle by performing the flip between the from-space and the to-space (60), activates the mutators (62) and ends the collection cycle (64).

The operation of looping over the records in a local buffer (steps 48 and 54 of FIG. 3) is illustrated in FIG. 4. After starting (70), the first address in the buffer is scanned (72). A location of the replica is determined in the to-space and the contents of the updated location are copied from from-space into to-space (74). At this point, the collector determines whether the value copied in to-space is a pointer (76). If so, the referred-to objects are scanned (78) and the pointer to the object is updated to refer to the new copy (80). If not, it is determined whether the scanned record is the last one (82) so that the process is ended (84). If not, the collector scans the next record address in the local buffer (86) and performs again the same process for this record. Note that the scanning operation means updating the references to from-space into references to to-space and copying the referenced objects from from-space to to-space if not yet copied, as it is well known to those skilled in the art.

It must be noted that the synchronization mechanism, which handles the access to the global list of local buffers, is an essential feature of the invention which is useful in two ways. On the one hand, it manages the queue of buffers which must handle parallel updates. On the other hand, this synchronization makes sure that, when the collector gets the buffer to work on, its view is updated to contain all the memory modification reported by the records in this buffer. This is true since, when the mutator synchronizes to insert the buffer into the queue, its view already reflects all these modifications. When the collector later synchronizes to get this buffer, it gets updated with these modifications as required.

Although the invention has been described in reference to a preferred embodiment, it is understood that numerous changes may be resorted to by those skilled in the art without departing from the scope of the invention. Thus, it would be possible to use several collectors running in parallel rather than a single collector. In such a case the synchronization problems would depend very much on the specific way chosen to implement the parallel collection.

What is claimed is:

1. In a multiprocessing system comprising a plurality of processors, a memory divided into a current area (from-space) used by said processors during current program execution and a reserved area (to-space), and at least one garbage collector for performing a garbage collection of flipping the roles of said current area and reserved area after all the live objects stored in said current area have been copied into said reserved area and for reclaiming said current area after the flipping operation, and wherein several program threads (mutators) or the like are currently running in parallel and said garbage collector performs said garbage collection in parallel with said program threads, the flipping operation being performed after said program threads have been stopped and said garbage collection has been completed;

an improved method of replication-based garbage collection comprising the following steps:
during normal program execution, each program thread storing a record in a local buffer allocated thereto each time said program thread updates a memory location, monitoring said local buffer to determine when it is full, and adding said local buffer when full to a global list of buffers using a first synchronization operation, and during garbage collection, said collector removing the local buffers one by one from said global list of buffers using a second synchronization operation, looping over records in each removed local buffer, and copying the updated memory locations into said reserved area until said global list is empty.

2. The method according to claim 1, wherein said synchronization operation is an instruction of wait-free synchronization performed without blocking any of said program thread and said collector which initializes such an instruction.

3. The method according to claim 2, wherein said wait-free synchronization instruction is of the type <<compare and swap>> instruction.

4. The method according to claim 1, further comprising the following steps after said program threads have been stopped:

determining whether said global list is not empty, such that is contains other buffers which have been added to the global list during the removing of buffers by said collector, and if said global list is not empty, said collector removing the new added buffers one by one from said global list, looping over the records in each removed buffer, and copying the updated memory locations into said reserved area until said global list is empty.

5. The method according to claim 2, further comprising the following steps after said program threads have been stopped:

determining whether said global list is not empty, such that is contains other buffers which have been added to the global list during the removing of buffers by said collector, and if said global list is not empty, said collector removing the new added buffers one by one from said global list, looping over the records in each removed buffer, and copying the updated memory locations into said reserved area until said global list is empty.

6. The method according to claim 3, further comprising the following steps after said program threads have been stopped:

determining whether said global list is not empty, such that is contains other buffers which have been added to the global list during the removing of buffers by said collector, and if said global list is not empty, said collector removing the new added buffers one by one from said global list, looping over the records in each removed buffer, and copying the updated memory locations into said reserved area until said global list is empty.

7. The method according to claim 4, wherein said step of looping over records and copying the updated memory in said reserved area is also performed with all local buffers allocated to said program threads after said global list has been emptied.

8. The method according to claim 5, wherein said step of looping over records and copying the updated memory in said reserved area is also performed with all local buffers allocated to said program threads after said global list has been emptied.

9. The method according to claim 6, wherein said step of looping over records and copying the updated memory in said reserved area is also performed with all local buffers allocated to said program threads after said global list has been emptied.

10. The method according to claim 1, wherein said step of looping over records in a local buffer consists in copying the contents of locations which have been updated from said current area to said reserved area.

11. The method according to claim 10, further comprising the step of determining whether the value copied in said reserved area is a pointer and if so, scanning the referred-to objects and updating said pointer.

12. The method according to claim 5, wherein said step of looping over records in a local buffer consists in copying the contents of locations which have been updated from said current area to said reserved area.

13. The method according to claim 12, further comprising the step of determining whether the value copied in said reserved area is a pointer and if so, scanning the referred-to objects and updating said pointer.

14. The method according to claim 6, wherein said step of looping over records in a local buffer consists in copying the contents of locations which have been updated from said current area to said reserved area.

15. The method according to claim 14, further comprising the step of determining whether the value copied in said reserved area is a pointer and if so, scanning the referred-to objects and updating said pointer.

16. A program storage device readable by machine, tangibly embodying a program of instructions executable by the machine to perform method steps for replication-based garbage collection in a multiprocessing system comprising a plurality of processors, a memory divided into a current area (from-space) used by said processors during current program execution and a reserved area (to-space), and at least one garbage collector for performing a garbage collection of flipping the roles of said current area and reserved area after all the live objects stored in said current area have been copied into said reserved area and for reclaiming said current area after the flipping operation, and wherein several program threads (mutators) or the like are currently running in parallel and said garbage collector performs said garbage collection in parallel with said program threads, the flipping operation being performed after said program threads have been stopped and said garbage collection has been completed the improved method of replication-based garbage collection comprising the steps of:

during normal program execution, each program thread storing a record in a local buffer allocated thereto each time said program thread updates a memory location, monitoring said local buffer to determine when it is full, and adding said local buffer when full to a global list of buffers using a first synchronization operation, and during garbage collection, said collector removing the local buffers one by one from said global list of buffers using a second synchronization operation, looping over records in each removed local buffer, and copying the updated memory locations into said reserved area until said global list is empty.

* * * * *